UNITED STATES PATENT OFFICE.

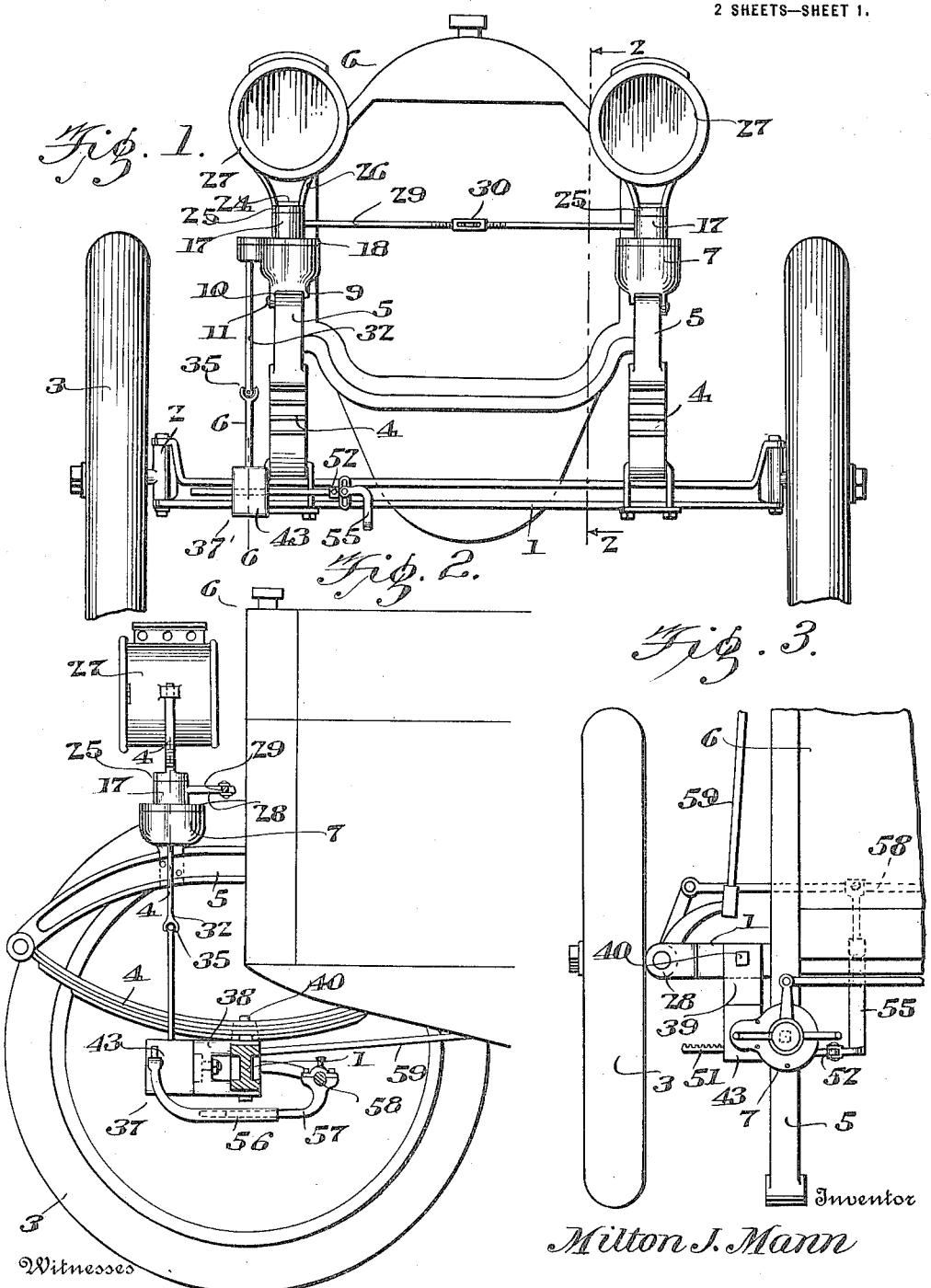

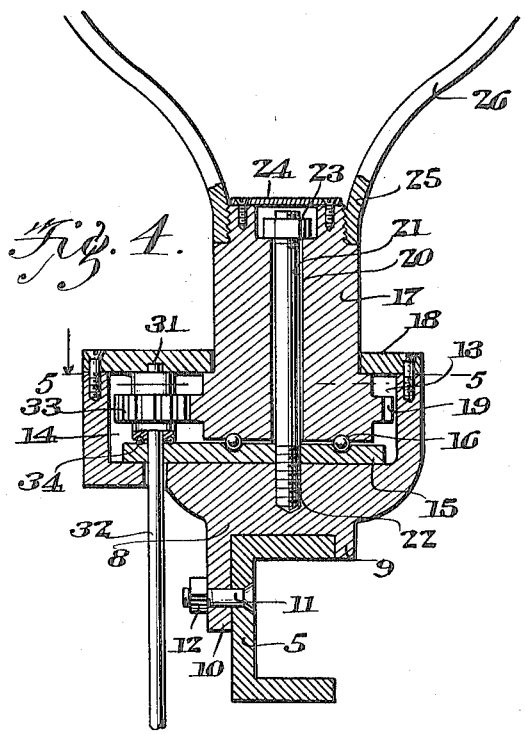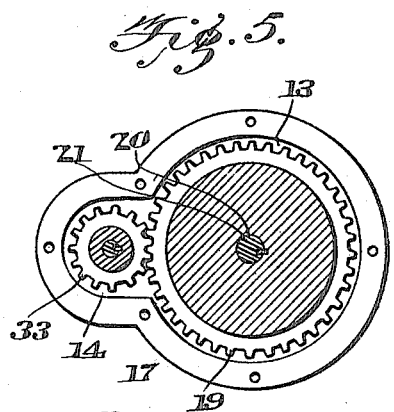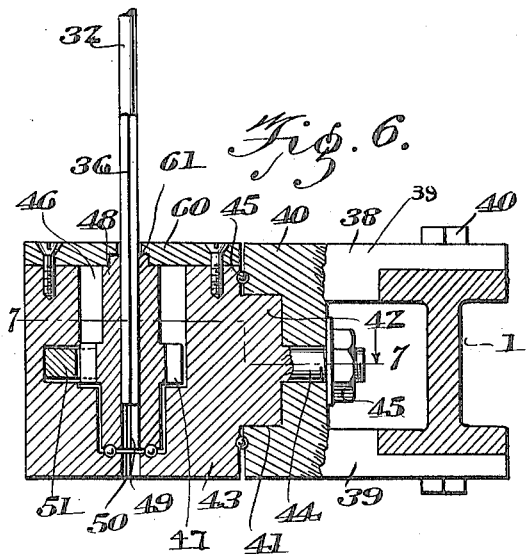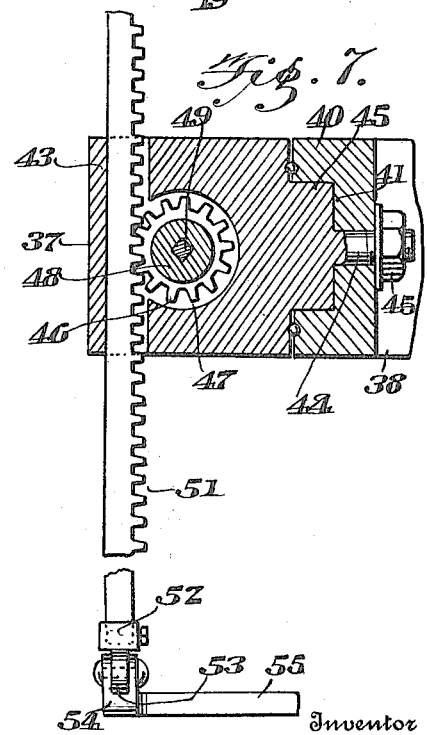

MILTON J. MANN, OF BANGOR, PENNSYLVANIA.

HEADLIGHT.

1,164,539.  Specification of Letters Patent.  Patented Dec. 14, 1915.

Application filed November 28, 1914. Serial No. 874,457.

*To all whom it may concern:*

Be it known that I, MILTON J. MANN, a citizen of the United States, residing at Bangor, in the county of Northampton and State of Pennsylvania, have invented new and useful Improvements in Headlights, of which the following is a specification.

The present invention relates to headlights for automobiles, and especially to means for directing the lights so that they will follow the wheels in turning corners or rounding curves, and thus permit the chauffeur to see directly ahead of the automobile, and the object of the invention is to construct a device of this class which may be arranged upon any ordinary automobile, and which shall embody the desirable features of simplicity, cheapness and thorough efficiency.

With the above and other objects in view, the improvement resides in the construction, combination and arrangement of parts set forth in the following specification and falling within the scope of the appended claims.

In the drawings: Figure 1 is a front elevation of an automobile with my improved head light construction arranged thereon, Fig. 2 is a sectional view approximately on the line 2—2 of Fig. 1 and looking in the direction of the arrows, Fig. 3 is a detail plan view, Fig. 4 is an enlarged sectional view approximately on the line 4—4 of Fig. 2, Fig. 5 is a horizontal sectional view on the line 5—5 of Fig. 4, Fig. 6 is an enlarged sectional view approximately on the line 6—6 of Fig. 1, and Fig. 7 is a horizontal sectional view approximately on the line 7—7 of Fig. 6.

Referring now to the drawings in detail, the numeral 1 designates the front axle of an automobile, the same having its ends pivotally connected with knuckle members 2 arranged upon the spindles for the front wheels 3.

4 designates the front springs, 5 the side bars to which the ends of the springs are secured, and 6 the body of the automobile.

The numeral 7 designates a casing which has a depending portion or lug 8 that is provided with a longitudinally extending depression or channel, providing a comparatively short inner flange 9 and a long flange 10, both of said flanges engaging with the opposite sides of the substantially U-shaped side bars 5 of the machine, while the longer flange is secured to the connecting member of said U-shaped side bars by a removable element, such as a bolt 11 and a nut 12 therefor, whereby the members 7 may be secured to or removed from the automobile as desired. Two of these members 7 are employed, one upon each of the side bars, and each preferably having its inner face or bore formed with an enlarged round portion 13 and a smaller round portion 14 that communicates with said portion 13. Arranged upon the horizontally straight bottom of the interior of the casing is a plate 15, the portion of the same arranged within the bore 13 being provided with a raceway for the reception of anti-frictional balls 16, the said balls also playing within a raceway provided upon the lower end of what I will term a hub 17. The hub has its lower portion provided with an annular enlargement, the upper shoulders being contacted by a closing plate 18 for the casing 7, and the said enlarged portion is centrally provided with peripheral teeth 19. The bore is also provided with a central passage 20 through which passes a threaded rod 21, the lower end of said rod passing through a threaded opening in the plate 15 and a threaded opening 22 in the lower portion of the casing. The opposite threaded end is engaged by a bolt 23 which is received within a depression in the outer or upper face of the hub 17, a plate 24 closing the said depression and being secured to the upper face of said hub. The hub may have its said upper portion threaded to receive the threaded ring member 25 to which are connected the arms 26 that support the lamp 27. Each of the hubs above the casing 16 is provided with a rearwardly extending arm 28, which has pivotally secured thereto, a rod 29, and the ends of each of the rods 29 are threaded for the reception of an adjusting member in the nature of a turn-buckle 30. By such an arrangement it will be noted that when one of the hubs is rotated, the second hub will be moved in unison therewith.

Passing through suitable openings in the lower wall of the casing 17 and having its upper end arranged within an annular depression 31 provided in the plate 18 is a shaft 32, the said shaft having splined thereto a spur wheel the same being arranged to mesh with the teeth 19 upon the hub 17, and preferably anti-frictional members 34 are arranged between the spur 33 and the bearing plate 15. The shaft 32 comprises two members connected by a knuckle joint 35, the lower section being square in cross section, as indicated by the numeral 36.

Secured to the front axle 1 of the machine, adjacent one of the front springs 4, is a boxing 37, the same comprising a box proper and a securing member for the box. The securing member, indicated by the numeral 38, comprises upper and lower spaced arms 38—39, each of which having its adjacent face at its free end recessed laterally to provide pockets for the horizontal members of the I-beam forming the front axle 1 of the machine, suitable securing elements, in the nature of bolts 40, passing through the arms 39 into the axle 1. The connecting member 41 for the arms 39 is provided upon its outer face with a centrally arranged longitudinally extending slot 41, providing a pocket for an annular lug 42 formed upon the box proper which may be indicated by the numeral 43. The lug 42 is centrally formed with a longitudinally extending threaded stem 44 which is engaged by a nut 45 which is, of course, disposed between the arms 39 of the member 38. Raceways are provided between the adjacent faces of the members 38 and 43, and anti-frictional bearings 45 are arranged within the said raceways. The box has its upper face provided with a round bore 46 and a reduced opening that communicates centrally with the said bore 46. Arranged within the bore 46 is a toothed wheel 47, the same having a hub 48 which projects from the opposite faces of the said toothed wheel and which is provided with a square bore 49 to receive the squared end 36 of the shaft 32. The bore 46 is centrally provided with a passage 50 through which the squared end 36 of the shaft may extend when the springs are contracted to an extraordinary degree. Passing through the slot 41 is a toothed bar 51, the teeth of the same engaging with the teeth of the wheel 47, and one of the ends of said bar 51 has arranged thereon a removable collar 52, the same having a lug 53 provided with an elongated opening to which is pivotally secured the bifurcated upper portion 54 of a longitudinally extending member 55, the said member being provided with a longitudinal opening providing a socket 56 for an arm 57 that is secured to the steering cross rod 58 for the knuckles 2.

The numeral 59 designates the steering direct connecting rod which is connected with the steering gear (not shown).

The operation of the device may be briefly described as follows: When the direct steering rod 59 is operated by the steering gear connected with the steering wheel, the same will rotate the knuckles 2 simultaneously through the medium of the steering cross rod 58 and as a consequence the arm 57 will be moved with the rod 58. The arm 57 will move with the steering cross rod 58 and moved longitudinally within the socket 56 of the member 55, such movement being permitted by the pivotal connection of the end 54 and ear 53 as well as by the pivotal connection of the member 43 with the member 40 of the box 38, while the knuckle joint 35 permits of the bending of the rod or shaft sections 32. It will be obvious that the rack bar will be moved longitudinally through the member 43 turning the toothed wheel 47 and rotating the shaft 32, revolving the spur gear 33 and rotating the hub 17, thus causing the lamps to be rotated to the angle assumed by the wheels 3. The bore 46 of the box 43 is closed by a removable plate 60, the said plate being centrally formed with an opening 61 through which the squared end 36 of a shaft 32 passes.

From the above description, taken in connection with the accompanying drawings, the simplicity of the device, as well as the advantages thereof will, it is thought, be perfectly apparent to these skilled in the art to which such invention appertains without further detailed description.

Having thus described the invention, what I claim is:

1. In a headlight director for vehicles, a headlight, a rotatable hub for the headlight, a shaft comprising a jointed member having a member co-acting with the hub, a longitudinal member co-acting with the shaft, said member having a loosely connected socket, and an arm secured upon the steering cross rod of the knuckle joint for the vehicle arranged within the socket.

2. In a headlight director for vehicles, a headlight, a rotatable hub for the headlight, a shaft comprising a jointed member having a member co-acting with the hub, a pivoted box in which one end of the shaft is received, a member movable longitudinally through the said box and co-acting with the shaft to rotate the shaft, a loosely connected socket associated with the said longitudinal member, an arm movable within the socket, and the said arm being secured to the steering cross rod of the knuckle member for the front axle of the vehicle.

In testimony whereof I affix my signature in presence of two witnesses.

MILTON J. MANN.

Witnesses:
GEO. W. FOX,
JUNIOR A. J. NAGLE.

Copies of this patent may be obtained for five cents each, by addressing the "Commissioner of Patents, Washington, D. C."